United States Patent Office 3,851,013
Patented Nov. 26, 1974

3,851,013
POLYESTER-ACRYLUREA THERMOSETTING MOULDING COMPOSITIONS
Hermann Perrey, Hans Jürgen Rosenkranz, Oskar Walter, and Hans Rudolph, Krefeld, Germany, assignors to Bayer Aktiengesellschaft, Leverkusen, Germany
No Drawing. Filed Apr. 9, 1973, Ser. No. 349,257
Claims priority, application Germany, Apr. 12, 1972, P 22 17 568.4
Int. Cl. C08f 21/00
U.S. Cl. 260—870
2 Claims

ABSTRACT OF THE DISCLOSURE

Thermosetting moulding compositions, which are free-flowing at room temperature, of unsaturated polyesters and copolymerisable compounds as well as, optionally, curing catalysts, accelerators, fillers and reinforcing materials, characterised in that the moulding compositions contain acrylureas as copolymerisable compounds.

---

Polymerisable mixtures, which are free-flowing at room temperature, of unsaturated polyesters and copolymerisable low molecular compounds are known in numerous variations, for example from DAS 1,117,306 and DBP 1,195,949. Derivatives of allyl alcohol are preferably employed as copolymerisable compounds. In addition, esters of acrylic acid are also used.

Endeavours have been made for a long time to find copolymerisable compounds which melt far above the derivatives hitherto proposed and still give free-flowing mixtures even in combination with extremely soft unsaturated polyesters. Such compounds must, of course not show any disadvantages relative to the known compounds as regards reactivity, miscibility and ease of flow at the curing temperature.

It has now been found that certain acrylamide derivatives fulfill all these conditions.

The subject of the invention are thermosetting moulding compositions, which are free-flowing at room temperature, of unsaturated polyesters and copolymerisable compounds and, optionally, curing catalysts, accelerators, fillers and reinforcing materials, which are characterised in that they contain acrylureas as copolymerisable compounds.

The class of the acrylureas includes compounds which contain the following grouping at least once:

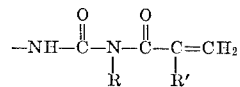   I

In this formula

R denotes H, alkyl or aryl;
R' denotes H or $CH_3$.

Alkyl-radicals are, e.g., those having from 1 to 18 carbon atoms such as methyl, ethyl, propyls, butyls, octyls, dodecyls, stearyl; aryl-radicals are, e.g., phenyl and alkylphenyls having from 7 to 15 carbon atoms.

Acrylureas to be employed according to the invention are easily accessible by reacting acrylamides with stoichiometric amounts of isocyanates.

By acrylamides there are here understood acrylamides and methacrylamides of which the amide groups can be substituted by an alkyl or aryl radical. Acrylamide and methacrylamide are preferred.

Suitable isocyanates are aliphatic, cycloaliphatic and aromatic monoisocyanates and polyisocyanates such as phenylisocyanate,
methylisocyanate,
cyclohexylisocyanate,
stearylisocyanate,
hexamethylenediisocyanate,
cyclohexane-1,4-diisocyanate,
2,4- and 2,6-toluolenediisocyanate and their mixtures,
isophoronediisocyanate (1-isocyanatomethyl-5-isocyanato-1,3,3-trimethylcyclohexane),
phoronediisocyanate (2,2,4- and 2,4,4-trimethylhexamethylene-1,6-diisocyanate),
1,5-naphthalenediisocyanate,
1,3-cyclopentylenediisocyanate, m- and p-phenylenediisocyanate,
2,4,6-toluolenetriisocyanate,
4,4',4''-triphenylmethanetriisocyanate,
1,3- and 1,4-xylylenediisocyanate,
3,3'-dimethyl-4,4'-diphenylmethanediisocyanate,
4,4'-diphenylmethanediisocyanate,
3,3'-dimethylbiphenylenediisocyanate,
4,4-biphenylenediisocyanate,
durenediisocyanate,
1-phenoxy-2,4'-phenylenediisocyanate,
1-tert.-butyl-2,4-phenylenediisocyanate,
methylene-bis-4,4'-cyclohexyldiisocyanate,
1-chloro-2,4-phenylenediisocyanate, and
4,4'-diphenyl-ether-diisocyanate.

The above acrylureas can be illustrated by the following formula:

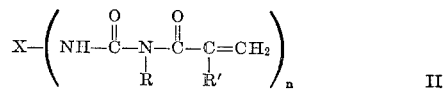   II in which

X denotes an aliphatic, cycloaliphatic or aromatic radical,
n denotes the valency of the radical, preferably 1–3,
R denotes H, alkyl or aryl and
R' denotes H or $CH_3$ The explanation for R in formula II is the same as for formula I. Aliphatic X-radicals are, e.g., alkyl radicals having from 1 to 18 carbon atoms, alkylene radicals having from 2 to 18 carbon atoms, alkanetriyls having from 3 to 18 carbon atoms and alkanetetrayls having from 4 to 18 carbon atoms; cycloaliphatic X-radicals are, e.g. cycloalkyl radicals having from 5 to 12 carbon atoms and cycloalkylene radicals having from 5 to 12 carbon atoms; aromatic X-radicals are e.g. phenyl, phenylenes, phenenyls, naphthyls, naphthylenes, bisphenyls, bisphenylenes, oxidiphenylenes, methylenediphenylenes, the aryl radicals may be substituted by one, two, there or four $C_1$–$C_4$-alkyl radicals and/or by halogen such as Cl or B, and/or by $C_1$–$C_3$-alkoxy radicals and/or by phenoxy.

The acrylureas can be manufactured in accordance with the process of German patent specification 888,316.

According to a preferred embodiment of the invention, the copolymerisable compounds used are acrylureas which are obtainable from polyfunctional isocyanates by reacting the isocyanate group partly with acrylamides and partly with monohydric or polyhydric alcohols.

Suitable alcohols for the manufacture of the abovementioned acrylureas are monohydric or polyhydric, aliphatic, cycloaliphatic or araliphatic alcohols which can be saturated or unsaturated. Examples of such alcohols are monohydric saturated aliphatic alcohols with 1–8 C atoms and allyl and methallyl alcohols. Polyhydric alcohols which preferably contain 2–4 hydroxyl groups, such as monoethylene glycol and polyethylene glycol, propanediol, butanediol, adipol, 1,4-dihydroxymethylcyclohexane, perhydrobisphenol-A, neopentyl gylcol, glycerine, trimethylolpropane and pentaerythritol.

These acrylureas can easily be obtained in the form of finely pulverulent amorphous products which can be incorporated particularly well into polyesters. To manufacture the acrylureas, the polyisocyanates can first be reacted with acrylamide or methacrylamide and subsequently with the alcohols. In the first stage, the acrylamides are only employed in such amounts that only a part of the isocyanate groups reacts. It is furthermore possible first to react a part of the isocyanate groups of the polyisocyanate with the alcohols and then to react the remaining free isocyanate groups with acrylamide or methacrylamide.

The reactions are generally carried out in boiling benzene, toluene, xylene, butyl acetate or ethyl glycol acetate, by treating a mixture of the isocyanate with acrylamide or methacrylamide and then adding the monohydric or polyhydric alcohol and allowing the reaction to finish. Colourless, dry powders are thus obtained in quantitative yield.

Where the abovementioned acrylureas are derived from difunctional isocyanates they can be illustrated by the following formula:

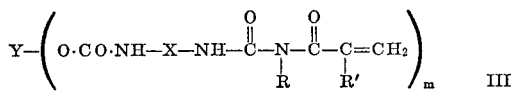

in this formula

Y denotes an aliphatic, cycloaliphatic or araliphatic radical, and $m$ denotes the valency of this radical X, R and R' have the same meaning as in the formula II.

The aliphatic and cycloaliphatic Y-radicals are the same as the aliphatic and cycloaliphatic X-radicals in forumla II; araliphatic Y-radicals are, e.g., phenylalkyls and phenylalkylenes having from 7 to 15 carbon atoms; the valency of the Y-radicals may be 1, 2, 3 or 4.

As polyesters in the sense of the invention it is possible to use all unsaturated polyesters which can be manufactured according to known processes (H. V. Boenig, Unsaturated Polyesters: Structures and Properties, pages 38–135, Elsevier Publishing Co., Amsterdam). In general, they are manufactured by the esterification of $\alpha,\beta$-ethylenically unsaturated dicarboxylics acids, such as maleic acid, fumaric acid or itaconic acid, with polyhydric alkanols, such as, for example, ethylene glycol, polyethylene glycol, propanediol, butanediol, adipol, 1,4-dihydroxymethylcyclohexane, perhydrobisphenol A, 2,2-di-(hydroxyethoxyphenyl) - propane, 2,2 - di(hydroxypropoxyphenyl)-propane, neopentyl glycol, glycerine, trimethylolpropane or pentaerythritol. Alongside the $\alpha,\beta$-ethylenically unsaturated dicarboxylic acids it is also possible to use other acids such as, for example, phthalic acid, isophthalic acid, terephthalic acid, succinic acid, adipic acid and tetrahydrophthalic acid. Here it must however be borne in mind that the reactivity of the polyester resin declines noticeably through the conjoint use of major amounts of saturated or aromatically unsaturated carboxylic acid radicals.

The moulding compositions according to the invention are cured, on heating, by thermal polymerisation initiators. However, in order to avoid a premature reaction care must be taken to select catalysts which only become active at higher temperatures then are employed in the manufacture of the compression moulding compositions. Suitable radical-forming agents in the sense of the invention are peroxides such as benzoyl peroxide, cyclohexanone peroxide, methyl ethyl ketone peroxide, tert.-butyl hydroperoxide, di-tert.-butyl peroxide, tert.-butyl perbenzoate, cumene hydroperoxide, tert.-butyl cumyl peroxide, tert.-butyl peroctoate, 1,1-di-tert.-butylperoxy-3,3,5-trimethylcyclohexane, acetylacetone peroxide, tert.-butyl-per-3,5,5-trimethylhexoate, dicumyl peroxide, 1,3-bis-(tert.-butylperoxyisopropyl)-benzene, 2,2-bis - (tert.-butylperoxy)-butane and the like, as well as benzpinacol and some derivatives, but preferably 1,3-bis-(tert.-butylperoxy-isopropyl)-benzene, tert.-butyl cumyl peroxide and dicumyl peroxide.

As fillers, ground chalk, dolomite, kaolin, talc, silicates, baryte, asbestos, quartz and the like, as well as pulverulent plastics, can be used with the moulding compositions according to the invention. Inorganic and organic pigments are furthermore suitable. Magnesium oxide, which is known from polyester technology, can also be used conjointly in the compositions according to the invention.

Reinforcing materials in the sense of the invention are glass fibres, synthetic fibres, such as polyacrylonitrile, polyamides, polyester fibres, rayon and staple viscose, and natural fibres, such as cotton, sisal and varieties of hemp. The fibres can be in the form of chopped fibres, mats or rovings.

As mould release agents it is possible to use, for example, the stearates of zinc, lead and aluminium and all other agents customary for the purpose.

The moulding compositions can be prepared in the melt, at temperatures between 70 and 100° C., in heated mills, kneaders, continuous kneaders or mixing screws. After cooling, and hence in the solid state, they can be comminuted to give particles of suitable size. In the case of polyesters which can be converted to powder, conjoint grinding of the components is also possible. If fabrics, fleeces or rovings are to be pre-impregnated it is advisable to dissolve the resin mixtures in low-boiling solvents such as, for example, acetone, methylene chloride or ethyl acetate and to cast the solutions on the fibre web or to pass the rovings through the solutions. The solvent can then be dried off under warm conditions.

Processing of the moulding compositions to give thermoset mouldings such as, for example, switches or cable end seals in the electrical field, is possible by the warm compression-moulding process or by the screw injection moulding process. In both methods curing takes place at temperatures of 140 to 200° C. and in the case of the screw injection moulding process the temperature in the screw space should be 65–100° C., preferably 70–90° C. For this type of processing it proves particularly advantageous that the moulding compositions according to the invention can be exposed to temperatures of 70–90° C. for several hours without curing. The acrylureas are generally added to the moulding compositions in amounts of 10–50% by weight relative to the mixture of acrylureas and unsaturated polyester resins.

The invention is not limited by the applications described above. Thus, additionally, the compositions according to the invention can be used with the additives customary in lacquer technology for coatings by the electrostatic powder spraying process and the fluidised bed process. Solvent-resistant coatings with good technical properties of the lacquer are obtained.

The examples which follow serve to explain the invention. All quantitative data relate to parts by weight, unless otherwise stated. Examples 1–4 explain the manufacture of certain acrylamides and the examples which follow explain the moulding compositions according to the invention and their use.

EXAMPLE 1

71 g. (1 mol) of acrylamide and 174 g. (1 mol) of toluolenediisocyanate isomer mixture, consisting of 65% of 2,4-toluolenediisocyanate and 35% of 2,6-toluolenediisocyanate, were heated in 1.5 l. of toluene to refluxing temperature for three hours. Thereafter 41 g. (0.33 mol) of fused 1,1,1-trimethylolpropane were added dropwise and the mixture was heated for a further hour. A colourless, pulverulent product was obtained in practically quantitative yield.

EXAMPLE 2

A mixture of 348 g. (2 mols) of a toluolenediisocyanate isomer mixture consisting of 80% of 2,4-toluolenediisocyanate and 20% of 2,6-toluolenediisocyanate and 227 g. (3.2 mols) of acrylamide in 2 l. of toluene was heated to the refluxing temperature for two hours. Thereafter 25 g. (0.4 mol) of glycol were added dropwise over the course of 30 minutes and the mixture was heated for a further hour. A colourless, pulverulent reaction product was obtained in quantitative yield.

EXAMPLE 3

The process of Example 2 was repeated, but instead of acrylamide methacrylamide was employed.

EXAMPLE 4

Analogous to Examples 1 and 2, 1 mol of 2,4-toluolene-diisocyanate was first reacted with one mol of acrylamide and then with one mol of allyl alcohol.

EXAMPLE 5

70 parts of a polyester manufactured in a known manner from 3 mols of maleic anhydride, 2 mols of phthalic anhydride and 5.25 mols of 1,2-propanediol (acid number 25, hydroxyl number 30), 30 parts of a crosslinking agent manufactured from 2 mols of acrylamide and 1 mol of toluene-2,4-diisocyanate by heating the components for two hours in boiling toluene, 100 parts of pulverulent chalk, 4 parts of zinc stearate, 2 parts of dicumyl peroxide and 50 parts of glass fibres of length 24 mm. are successively introduced in a steam-heated kneader, and homogenised. The resulting product was hard and nontacky after it had cooled and could be ground in a hammer mill to give a granular compression-moulding composition. The composition was processed in a moulding press at 160° C. and a press pressure of 100 kp./cm.². The pressings showed good surface character and excellent mechanical properties—Martens softening points of above 175° C. were found—and very good chemical resistance.

EXAMPLE 6

The process of Example 5 was repeated, but the reaction product of 1 mol toluolene-2,4-diisocyanate and 2 mols of methacrylamide was here employed as the crosslinking agent. This product can again be manufactured easily in boiling toluene.

EXAMPLE 7

The process of Example 5 was repeated, but the reaction product according to Example 1 was employed as the crosslinking agent.

EXAMPLE 8

The process of Example 5 was repeated, but the reaction product according to Example 2 was employed as the crosslinking agent.

EXAMPLE 9

The process of Example 5 was repeated, but the adduct of 1 mol of toluolenediisocyanate, 1 mol of acrylamide and 1 mol of allyl alcohol, manufactured according to Example 4, was used as the crosslinking agent.

EXAMPLE 10

The process of Example 5 was repeated, but the adduct of 2 mols of acrylamide and 1 mol of 4,4'-diphenylmethanediisocyanate, which was manufactured by reaction of the components in boiling toluene, was employed as the crosslinking agent.

EXAMPLE 11

The process of Example 5 was repeated, but the adduct of 2 mols of acrylamide and 1 mol of hexamethylenediisocyanate, which can be manufactured by reaction of acrylamide with hexamethylenediisocyanate in ether glycol acetate at 150° C. was employed as the crosslinking agent.

EXAMPLE 12

70 parts of the unsaturated polyester according to Example 5, 30 parts of the crosslinking agent according to Example 2, 100 parts of pulverulent chalk, 1 part of magnesium oxide, 4 parts of zinc stearate, 2 parts of dicumyl peroxide and 50 parts of glass fibres of length 6 mm. were successively fed onto a heated roll mill, and the mixture was homogenised. After cooling, the resulting product could be ground on a hammer mill to give a free-flowing, granular composition which even on prolonged storage at temperatures of up to 40° C. showed no tendency to stick together.

The composition could be processed excellently on an injection moulding machine at a screw temperature of 80–90° C.—at this temperature the composition as yet showed no tendency to cure over the course of several hours—and an injection pressure of 400 kp./cm.². The curing temperature in the mould was 150° C. The mouldings were of excellent surface character and chemical resistance and showed good mechanical properties.

EXAMPLE 13

100 parts of the composition according to Example 8 were mixed with 30 parts of a mixture of methylene chloride and ethyl acetate. Glass fibre rovings were impregnated with this mixture by passing the rovings through the mixture and winding them up on a winding mandrel for drying. Thereafter the rovings were chopped into pieces of different length. The short lengths are completely non-tacky and free-flowing and do not cake together even at temperatures of up to 40° C. for several weeks.

EXAMPLE 14

100 parts of an unsaturated polyester resin from 3 mols of maleic anhydride, 2 mols of phthalic anhydride, 4.2 mols of neopentyl glycol and one mol of perhydrobisphenol A were homogenised with 85 parts of titanium dioxide pigment, 20 parts of the adduct of 2 mols of acrylamide and 1 mol of hexamethylenediisocyanate and 2 parts of dicumyl peroxide on a roll mill at approx. 95° C. The solidified mixture was finely ground in a mill and subsequently freed by sieving of particles greater than 100μ. The powder was sprayed in an electrostatic powder spraying installation onto well degreased iron sheets. After stoving for 15 minutes at 160° C., a hard, solvent-resistant lacquer was obtained.

What is claimed is:

1. A thermosetting moulding composition which is free-flowing at room temperature, said moulding composition comprising (1) a polyester of an α,β-ethylenically unsaturated dicarboxylic acid and a polyhydric alkanol and (2) a compound of the formula

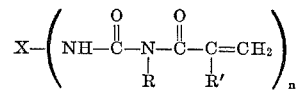

wherein X is an aliphatic, cycloaliphatic or aromatic radical, $n$ is the valency of X, R is hydrogen, alkyl or aryl and R' is hydrogen or methyl.

2. A thermosetting moulding composition which is free-flowing at room temperature, said moulding composition comprising (1) a polyester of an α,β-ethylenically unsaturated dicarboxylic acid and a polyhydric alkanol and (2) a compound of the formula

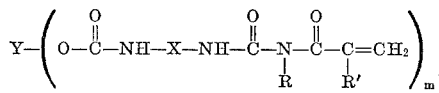

wherein Y is an aliphatic, cycloaliphatic or aromatic radical, $m$ is the valency of Y, X is an aliphatic, cycloaliphatic or aromatic bivalent radical, R is hydrogen, alkyl or aryl and R' is hydrogen or methyl.

References Cited

UNITED STATES PATENTS 2,598,664  6/1952  Kropa.
2,820,020  1/1958  Franco-Filipasic.

MELVIN GOLDSTEIN, Primary Examiner

U.S. Cl. X.R.

260—40 R, 482 B & C, 553 E